US012692799B2

(12) United States Patent
Tomes et al.

(10) Patent No.: US 12,692,799 B2
(45) Date of Patent: Jul. 28, 2026

(54) CONTAINMENT RING FOR GAS TURBINE ENGINE

(71) Applicant: Pratt & Whitney Canada Corp., Longueuil (CA)

(72) Inventors: Nathan Tomes, Hamilton (CA); Tyler Richardson, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/661,352

(22) Filed: May 10, 2024

(65) Prior Publication Data

US 2025/0347229 A1 Nov. 13, 2025

(51) Int. Cl.

*F01D 11/12* (2006.01)
*F01D 21/04* (2006.01)
*F01D 25/24* (2006.01)

(52) U.S. Cl.

CPC ........... *F01D 21/045* (2013.01); *F01D 25/24* (2013.01); *F05D 2250/283* (2013.01); *F05D 2300/10* (2013.01)

(58) Field of Classification Search

CPC ...... F04D 29/526; F04D 29/52; F04D 29/023; F04D 29/40; F01D 21/045; F01D 25/24; F01D 11/12; F01D 11/22; F01D 11/125; F01D 11/127; F05D 2240/14

See application file for complete search history.

(56) References Cited

U.S. PATENT DOCUMENTS 4,475,864 A 10/1984 Patacca et al.
4,534,698 A * 8/1985 Tomich ................. F01D 21/045 415/121.2
6,619,913 B2 * 9/2003 Czachor ................ F01D 21/045 415/173.1
6,652,222 B1 * 11/2003 Wojtyczka ................ B32B 5/18 415/200
10,458,433 B2 * 10/2019 Kling ...................... B29C 70/86
10,655,500 B2 * 5/2020 Heeter ...................... B32B 5/02
2021/0054762 A1 2/2021 Ivakitch et al.
2021/0246807 A1 8/2021 Caulfeild
2023/0243275 A1 * 8/2023 Heeter .................. F01D 21/045 415/213.1

FOREIGN PATENT DOCUMENTS

EP 2458162 A2 5/2012
WO 2020011617 A1 1/2020

OTHER PUBLICATIONS

Extended European Search Report for EP Application No. 25175649.0; Mailing date, Oct. 9, 2025, 11 pages.

* cited by examiner

*Primary Examiner* — Nathaniel E Wiehe
*Assistant Examiner* — Maxime M Adjagbe
(74) *Attorney, Agent, or Firm* — CANTOR COLBURN LLP

(57) ABSTRACT

A casing for a gas turbine engine, including: an inner surface portion; a pair of wall portions extending radially outward from the inner surface portion; and a containment ring located between the pair of wall portions, the containment ring including an inner ring, an intermediate ring, and an outer ring, the intermediate ring being located between the inner ring and the outer ring, wherein the containment outer ring is mechanically decoupled from the pair of wall portions.

14 Claims, 3 Drawing Sheets

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: an inner surface portion; a pair of wall portions extending radially outward from the inner surface portion; and a containment ring located between the pair of wall portions, the containment ring including an inner ring, an intermediate ring, and an outer ring, the intermediate ring being located between the inner ring and the outer ring, wherein the containment outer ring is mechanically decoupled from the pair of wall portions.

In addition to one or more of the features described above, or as an alternative to any of the foregoing embodiments, intermediate ring is a layer of honeycomb and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring.

In addition to one or more of the features described above, or as an alternative to any of the foregoing embodiments, the outer ring is formed from a composite material.

In addition to one or more of the features described above, or as an alternative to any of the foregoing embodiments, the outer ring is formed from metal.

In addition to one or more of the features described above, or as an alternative to any of the foregoing embodiments, the intermediate ring is a layer of foam and the inner ring is a layer of honeycomb sandwich, the layer of honeycomb sandwich of the inner ring being stiffer than the layer of foam of the intermediate ring.

In addition to one or more of the features described above, or as an alternative to any of the foregoing embodiments, the outer ring is formed from a composite material and the outer ring is releasably bonded to the intermediate ring.

In addition to one or more of the features described above, or as an alternative to any of the foregoing embodiments, the outer ring is formed from metal.

In addition to one or more of the features described above, or as an alternative to any of the foregoing embodiments, a pair of flanges extend radially outward from the inner surface portion, the pair of wall portions being located between the pair of flanges.

In addition to one or more of the features described above, or as an alternative to any of the foregoing embodiments, the pair of wall portions are each connected to one of the pair of flanges by one of a pair axially extending connection portions of the inner surface portion.

In addition to one or more of the features described above, or as an alternative to any of the foregoing embodiments, the pair of flanges, the pair of wall portions, the pair axially extending connection portions and the inner surface portion are formed as a single unitary structure.

In addition to one or more of the features described above, or as an alternative to any of the foregoing embodiments, the pair of flanges, the pair of wall portions, the pair axially extending connection portions and the inner surface portion are formed from a composite material.

In addition to one or more of the features described above, or as an alternative to any of the foregoing embodiments, the pair of flanges, the pair of wall portions, the pair axially extending connection portions and the inner surface portion are formed from metal.

In addition to one or more of the features described above, or as an alternative to any of the foregoing embodiments, the intermediate ring is a layer of honeycomb and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring.

In addition to one or more of the features described above, or as an alternative to any of the foregoing embodiments, the outer ring is formed from a composite material.

In addition to one or more of the features described above, or as an alternative to any of the foregoing embodiments, the outer ring is formed from metal.

In addition to one or more of the features described above, or as an alternative to any of the foregoing embodiments, the intermediate ring is a layer of foam and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring.

In addition to one or more of the features described above, or as an alternative to any of the foregoing embodiments, the outer ring is formed from a composite material.

In addition to one or more of the features described above, or as an alternative to any of the foregoing embodiments, the outer ring is formed from metal.

Also disclosed is a gas turbine engine, including: a fan having a plurality of fan blades; a casing surrounding the plurality of fan blades, the casing including: an inner surface portion; a pair of wall portions extending radially outward from the inner surface portion; and a containment ring located between the pair of wall portions, the containment ring including an inner ring, an intermediate ring, and an outer ring, the intermediate ring being located between the inner ring and the outer ring, wherein the outer ring is mechanically decoupled from the pair of wall portions.

In addition to one or more of the features described above, or as an alternative to any of the foregoing embodiments, the intermediate ring is a layer of honeycomb or foam and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring and the outer ring is formed from a composite material or metal and the casing further comprising a pair of flanges extending radially outward from the inner surface portion, the pair of wall portions being located between the pair of flanges, wherein the pair of wall portions are each connected to one the pair of flanges by one of a pair axially extending connection portions.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
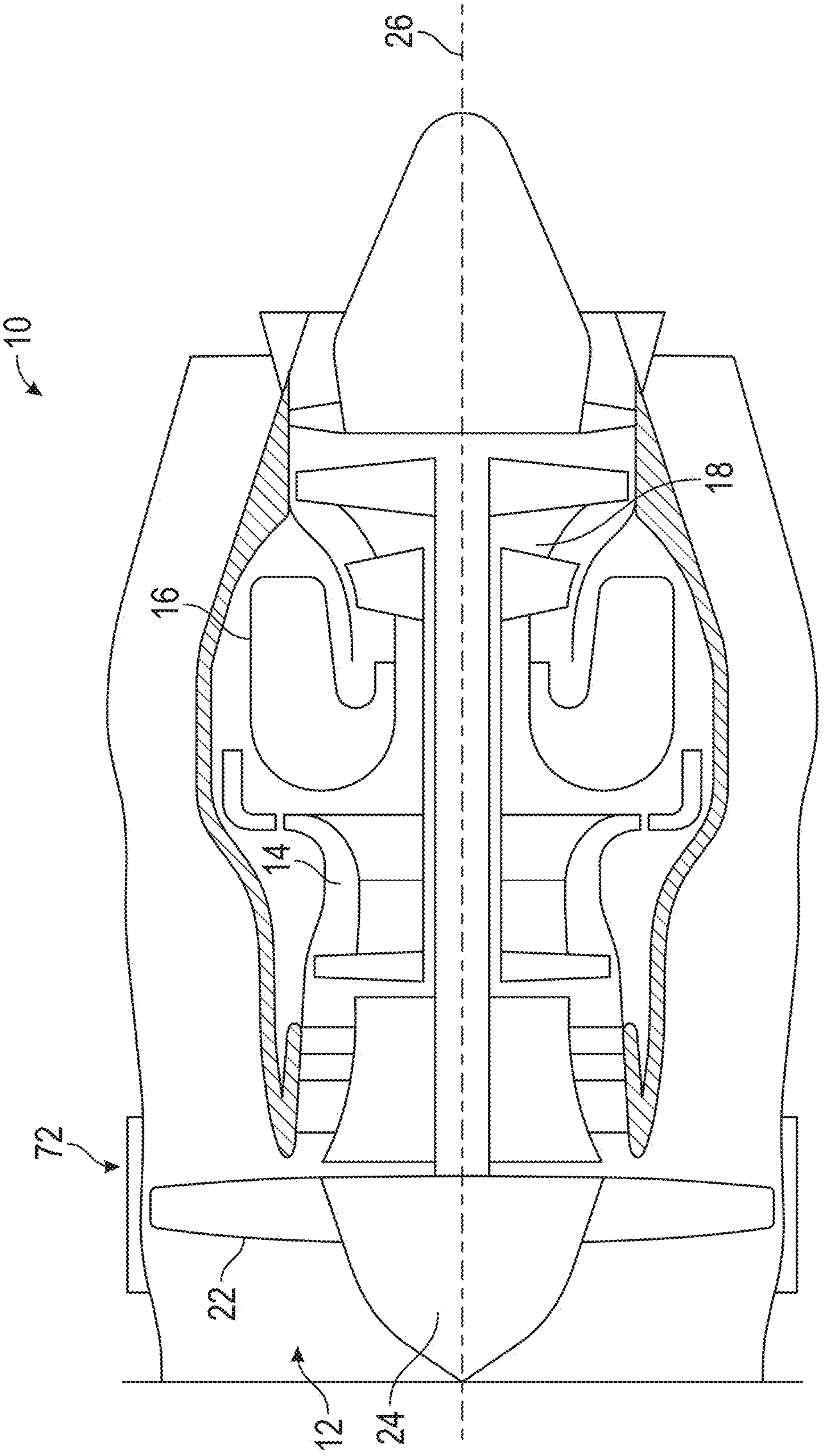
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms "radial", "axial" and "circumferential" used throughout the description and the appended claims, are defined with respect to the central axis 26 of the engine 10. The terms "front", "forward" "afore", "aft" and after" used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade's kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

As used herein forward or upstream and rearward or downstream refer are relative to the engine central longitudinal axis 26 and the direction gases flowing through the gas turbine engine 20. In addition, radially inward and radially outward also refer to the engine central longitudinal axis 26.

Figure 2:
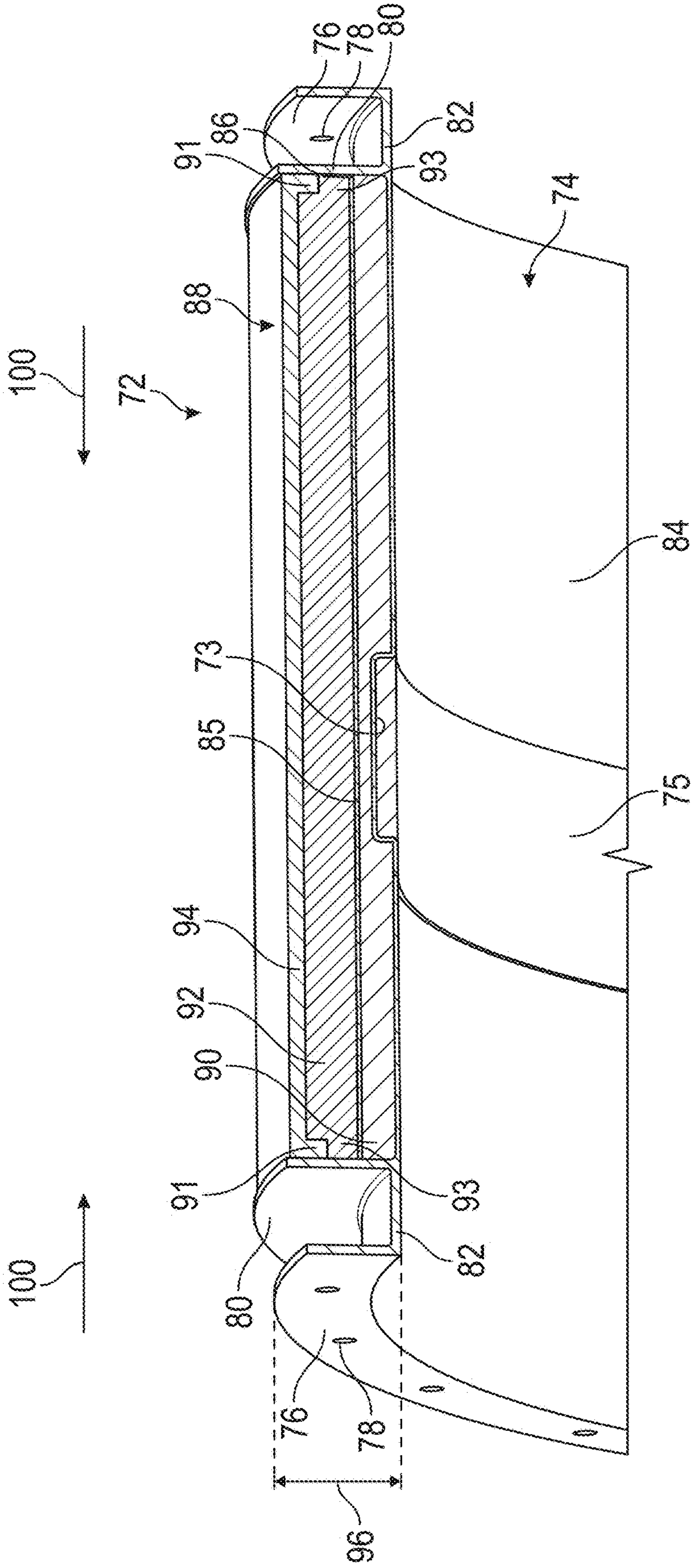
FIG. 2 is a partial perspective cross-sectional view of a fan case in accordance with the present disclosure.
Figure 3:
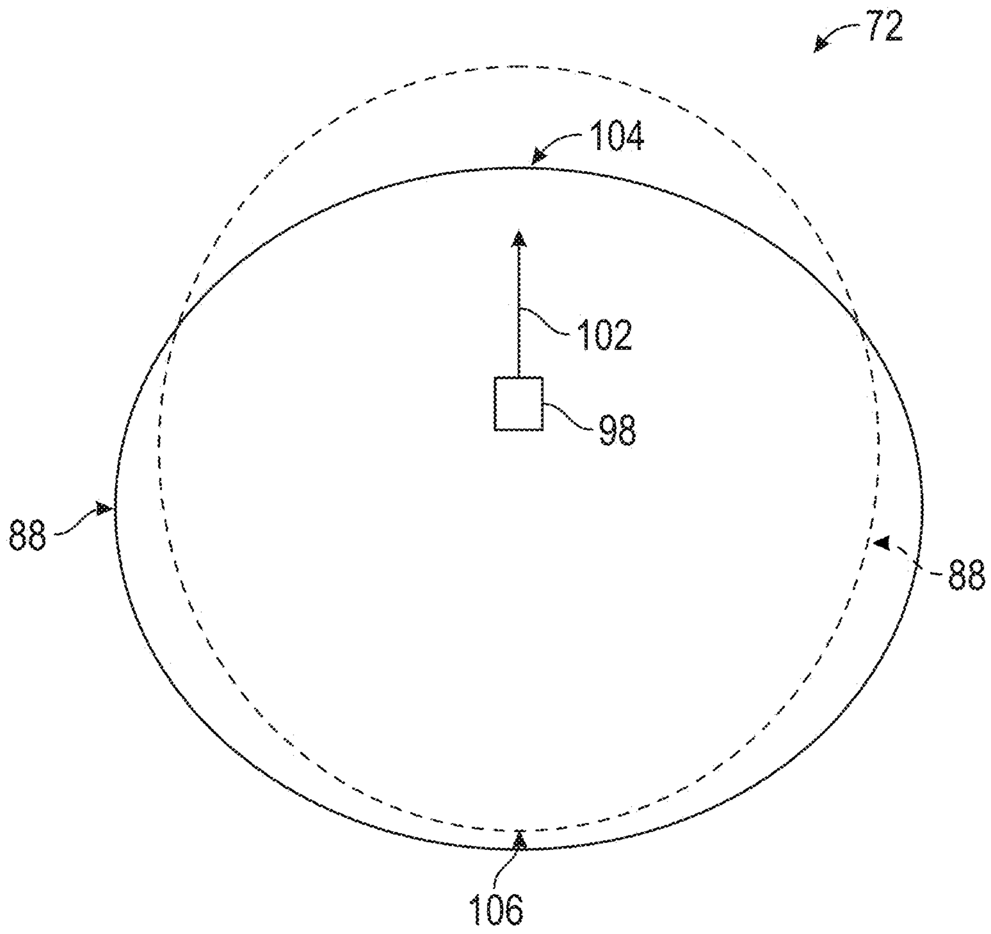
FIG. 3 is schematic end view of a fan case in accordance with the present disclosure.

FIGS. 2 and 3 illustrate a portion of a case or casing 72 in accordance with the present disclosure. In one embodiment, the case or casing 72 is a fan case or casing 72 intended to retain fan blades 22 of the fan 12. It should be understood that while the case or casing 72 is illustrated as a fan case or casing the design of the case or casing 72 can be applied to other containment stages of the gas turbine engine (e.g., compressor section and turbine section).

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, "integral" or "integrally formed" is intended to cover a single unitary structure. In other words, the single unitary structure is not capable of being disassembled without cutting or destruction of the single unitary structure.

As illustrated in at least FIG. 2, the case or casing 72 includes an inner surface portion or gas path surface 74. Extending radially outward from the inner surface portion or gas path surface 74 is a pair of flanges 76. The flanges 76 may have openings 78 for bolts or fasteners (not shown) to pass therethrough in order to secure the casing 72 to engine 20. In addition, the case or casing 72 has a pair of wall portions 80 that extend radially outward from the inner surface portion or gas path surface 74. The pair of wall portions 80 being connected to the pair of flanges 76 by an axially extending connection portion 82. In one non-limiting embodiment, the axially extending connection portion 82 is formed from the same material as the pair of wall portions 80 being connected to the pair of flanges 76.

The pair of flanges 76 may be referred to as a first radially extending flange portion 76 spaced from a second radially extending flange portion 76. The first radially extending flange portion 76 being forward with respect to the second radially extending flange portion 76. The pair of wall portions 80 may be referred to as a first radially extending wall portion 80 spaced from a second radially extending wall portion 80. The first radially extending wall portion 80 being forward with respect to the second radially extending wall portion 80. In addition, the first radially extending wall portion 80 and the second radially extending wall portion 80 are connected to each other at one end by an axially extending portion 84 that defines a portion of the inner surface portion 74 that extends between the radially extending wall portions 80 while an opposite end of the first radially extending wall portion 80 and the second radially extending wall portion 80 are not connected to each other such that a cavity 86 is defined by the first radially extending wall portion 80, the second radially extending wall portion 80 and the axially extending portion 84.

Located in the cavity is a containment ring 88. The containment ring 88 includes an inner ring 90, an intermediate ring 92, and an outer ring 94, the intermediate ring 92 being located between the inner ring 90 and the outer ring 94. In one embodiment the outer ring 94 is a hard wall containment ring that is mechanically decoupled from the first radially extending wall portion 80 and the second radially extending wall portion 80.

In one embodiment the intermediate ring 92 is a layer of honeycomb or a layer of foam and the inner ring 90 is a layer of honeycomb sandwich. In one non-limiting embodiment, the layer of foam or layer honeycomb of the intermediate later 92 is a low strength crushable bulk energy absorption layer (foam or honeycomb), bonded to the inner ring 90. In one non-limiting embodiment, the layer of foam is an aluminum or polymer open or closed cell foam and the bonding materials are anyone of epoxy or polyurethane or polyurethane or equivalents thereof. In one embodiment, the honeycomb layer of the inner ring 90 is stiffer than the layer of foam or honeycomb layer of the intermediate ring 92. In one non-limiting embodiment, the inner ring 90 is formed from a structural configuration or sandwich of the axially extending portion 84, the layer of foam or honeycomb of the inner ring 90 and a top or radially outward sheet of material 85. In the illustrated configuration, the top or radially outward sheet of material 85 is located between the layer of foam or honeycomb of the inner ring 90 and the layer of foam or honeycomb of the intermediate ring 92 and the layer of foam or honeycomb of the intermediate ring 92 is bonded to the top or radially outward sheet of material 85 of the inner ring 90.

In one non-limiting embodiment, the top or radially outward sheet of material 85 is a layer of sheet metal or metal or a reinforced composite. In one non-limiting embodiment, the outward sheet of material 85 is formed from the same material as the radially extending wall portions 80, axially extending connection portion 82 and flanges 76. In this embodiment the, inner ring 90 is first applied to the outward sheet of material 85 and then the axially extending portion 84 is applied to a radial inner surface of the inner ring 90, this axially extending portion 84 forming or providing the inner surface portion or gas path surface 74.

In yet another alternative, the axially extending portion 84 is formed from the same material as the radially extending wall portions 80, axially extending connection portion 82 and flanges 76. In this embodiment the, inner ring 90 is first applied to the axially extending portion 84 and then the outward sheet of material 85 is then applied.

In one non-limiting embodiment, the reinforced composite material is anyone of glass, carbon, or aramid fiber reinforced epoxy or equivalents thereof. In one non-limiting embodiment, the axially extending portion 84 extends between walls 80. In one embodiment, the structural composite of the inner ring 90 comprises the axially extending portion 84, the layer of honeycomb or layer of foam 90 and the top or radially outward sheet material 85. In one embodiment, these materials are all bonded together and are bonded to the wall portions 80 such that the inner ring 90 carries the load between walls 90. The inner ring 90, the intermediate ring 92 and outer ring 94 when secured to each other define the containment ring 88 and has a radial height 96.

In one non-limiting embodiment, the layer of honeycomb is NOMEX honeycomb or aluminum single or double flex honeycomb or corrugated aluminum. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof.

The containment ring 88 comprising the inner ring 90, the intermediate ring 92 and outer ring 94 is located between the wall portions 80 however, the outer ring 94 is not mechanically secured to the wall portions 80. As such, there is no fixed connection between the outer ring 94 and the retaining walls 80. However and in one embodiment, the outer ring 94 is only loosely mechanically attached or releasably bonded to the intermediate ring 92 such that the outer ring 94 can be released from the intermediate ring 92 and the intermediate ring 92 is mechanically secured or bonded to the inner ring 90. In yet another embodiment, the outer ring 94 is not mechanically attached to the intermediate ring 92 nor the wall portions 80.

In one non-limiting embodiment, the outer ring 94 may have a pair of radially extending flange portions 91 that extend radially inward and are received by complimentary stepped or flange portions 93 of the intermediate ring 92. In the illustrated embodiment, the pair of radially extending flange portions 91 and the complimentary stepped or flange portions 93 are located adjacent to or proximate to the wall portions 80. The configuration of the pair of radially extending flange portions 91 and the complimentary stepped or flange portions 93 create a releasable interlock between the outer ring 94 and the intermediate ring 92. Of course, it is understood that various embodiments of the present disclosure contemplate and outer ring 94 and intermediate ring 92 interface without the pair of radially extending flange portions 91 and the complimentary stepped or flange portions 93.

Under fan blade off (FBO), a released blade 98 will first engage the axially extending portion 84 and pass through the structural honeycomb sandwich layer or the inner ring 90 and the low strength foam or low strength honeycomb layer of the intermediate ring 92 with minimal resistance and hit the containment ring or outer ring 94 with most of its initial kinetic energy remaining.

Since the hard wall or the outer ring 94 is mechanically decoupled from the retaining walls 80 the outer ring 94 is free to contract axially in the direction of arrows 100 but the containment ring 88 will be kept in place by the retaining walls 80. As the released blade pushes the ring radially in the direction of arrow 102, the ring will ovalize and move in rigid body motion. This is illustrated by the dashed lines in FIG. 3.

The ovalization of the containment ring 88 will crush large areas of low strength foam tangentially adjacent to an impact point 104, and the motion of the outer ring or rigid ring 94 motion will crush large areas of intermediate layer 92 comprising the low strength foam or honeycomb on an opposite side 106 of the fan case 72 from the impact point 104. This large area of crushing adds up to significant energy absorption and effective redistribution of containment forces.

The result is an outer ring or hard wall containment design which allows redistribution of containment forces such that the flanges 76 and the adjacent parts can be made lighter in weight, like a soft wall design but without the large bulge and associated keep out zone required for a soft wall design. If the sandwich of the inner ring 90 and the light foam or honeycomb of the intermediate layer 92 are thick enough, released blade nesting would occur which is also beneficial.

In an alternative embodiment, the outer ring 94 of the containment ring 88 may be made of a composite material such as a fiber reinforced structure that is cured in place. In an alternative embodiment, the retaining walls 80 can be secured to the case or casing 72 after the outer ring 94 is in place, allowing the outer ring 94 of the containment ring 88 to be made of forged metal or any other material.

In one non-limiting embodiment, the fan case structure 72 comprising the inner surface portion 74, the flanges 76, wall portions 80 and the axially extending connection portions 82 may be made of a single unitary structure. In one non-limiting embodiment, the fan case structure 72 comprising the inner surface portion 74 defined by axially extending portion 84, the flanges 76, wall portions 80 and the axially extending connection portions 82 may be made of a composite material or a reinforced composite such as carbon fiber reinforced epoxy as opposed to sheet metal or metal.

This would allow the possibility of curing the flanges and retaining walls separately, and then integrating them with the inner ring 90, intermediate ring 92 and containment ring or outer 94 separately. This would allow the containment ring or outer ring 94 to be made of any material.

Alternatively, the axially extending portion 84 defining the inner surface portion 74, the flanges 76, wall portions 80 and the axially extending connection portions 82 may be made of a thin layer of structural material such as a thin sheet metal or metal.

In one embodiment and if the outer ring 94 is formed from metal then at least the walls 80 will be formed from a composite material. Alternatively, the outer ring 94 may be formed from a composite material and then at least the walls 80 will be formed from a metal. In yet another alternative, both the outer ring 94 and at least the walls 80 are formed from a composite material. It is also understood that in any of the aforementioned, variations the walls 80 may be formed from the same material as the axially extending connection portions 82 and the flanges 76 and they may be separated assembled (e.g., welded together) of formed as a single unitary component of at least the walls 80, the axially extending connection portions 82 and the flanges 76 and in some instance radially outward sheet material 85 or alternatively the axially extending portion 84. As mentioned above, if the radially outward sheet material 85 is secured to the walls 80 first, then the inner ring 90 must be applied before the axially extending portion 84 is secured to the casing 72. Alternatively, if the axially extending portion 84 is secured to the walls 80 first, then the inner ring 90 must be applied before the radially outward sheet material 85 is secured to the casing 72.

In one non-limiting embodiment, the inner surface portion or gas path skin 74 formed by the axially extending portion 84 may be formed with a recessed area 73 for receipt of an abradable surface or layer 75 such as a composite potting material. The abradable surface 75 being aligned with rotating blades 22 of the fan 12. The recessed area 73 and the abradable surface or layer 75 are located on the inner surface portion or gas path skin 74. Of course, embodiments of the present disclosure contemplate the inner surface portion or gas path skin 74 without the recessed area 73 and abradable surface or layer 75. The inner surface portion or gas path skin 74 may also be configured to have perforations for acoustic purposes.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:

an inner surface portion;

a pair of wall portions extending radially outward from the inner surface portion; and a containment ring located between the pair of wall portions, the containment ring including an inner ring, an intermediate ring, and an outer ring, the intermediate ring being located between the inner ring and the outer ring, wherein the outer ring is formed from a composite material or a metal and the outer ring is mechanically decoupled from the pair of wall portions such that deformation and ovalization of the outer ring due to forces at a point of impact will redistribute containment forces from the outer ring to the intermediate ring at a location opposite to the point of impact;

wherein the outer ring has a pair of radially extending flange portions that are received by complimentary portions of the intermediate ring, each radially extending flange portion of the pair of radially extending flange portions installed axially between an axial extent of the intermediate ring and a wall portion of the pair of wall portions.

2. The casing as in claim 1, wherein the intermediate ring is a layer of honeycomb and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring.

3. The casing as in claim 1, wherein the intermediate ring is a layer of foam and the inner ring is a layer of honeycomb sandwich, the layer of honeycomb sandwich of the inner ring being stiffer than the layer of foam of the intermediate ring.

4. The casing as in claim 3, wherein the outer ring is formed from a composite material and the outer ring is releasably bonded to the intermediate ring.

5. The casing as in claim 3, wherein the outer ring is formed from metal.

6. The casing as in claim 1, further comprising a pair of flanges extending radially outward from the inner surface portion, the pair of wall portions being located between the pair of flanges.

7. The casing as in claim 6, wherein the pair of wall portions are each connected to one of the pair of flanges by one of a pair of axially extending connection portions of the inner surface portion.

8. The casing as in claim 7, wherein the pair of flanges, the pair of wall portions, the pair of axially extending connection portions and the inner surface portion are formed as a single unitary structure.

9. The casing as in claim 8, wherein the pair of flanges, the pair of wall portions, the pair of axially extending connection portions and the inner surface portion are formed from a composite material.

10. The casing as in claim 8, wherein the pair of flanges, the pair of wall portions, the pair of axially extending connection portions and the inner surface portion are formed from metal.

11. The casing as in claim 10, wherein the intermediate ring is a layer of honeycomb and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of honeycomb of the intermediate ring.

12. The casing as in claim 10, wherein the intermediate ring is a layer of foam and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the layer of foam of the intermediate ring.

13. A gas turbine engine, comprising:

a fan having a plurality of fan blades;

a casing surrounding the plurality of fan blades, the casing comprising:

an inner surface portion;

a pair of wall portions extending radially outward from the inner surface portion; and a containment ring located between the pair of wall portions, the containment ring including an inner ring, an intermediate ring, and an outer ring, the intermediate ring being located between the inner ring and the outer ring, wherein the outer ring is formed from a composite material or a metal and the outer ring is mechanically decoupled from the pair of wall portions such that deformation and ovalization of the outer ring due to forces at a point of impact will redistribute containment forces from the outer ring to the intermediate ring at a location opposite to the point of impact;

wherein the outer ring has a pair of radially extending flange portions that are received by complimentary portions of the intermediate ring, each radially extending flange portion of the pair of radially extending flange portions installed axially between an axial extent of the intermediate ring and a wall portion of the pair of wall portions.

14. The gas turbine engine as in claim 13, wherein the intermediate ring is a layer of honeycomb or foam and the inner ring is a structural configuration of an axially extending portion of the inner surface portion, a layer of foam or honeycomb and a radially outward sheet of material, the layer of foam or honeycomb being located between the axially extending portion of the inner surface portion and the radially outward sheet of material, the inner ring being stiffer than the intermediate ring and the casing further comprising a pair of flanges extending radially outward from the inner surface portion, the pair of wall portions being located between the pair of flanges, wherein the pair of wall portions are each connected to one the pair of flanges by one of a pair axially extending connection portions.

* * * * *